United States Patent
Phuyal et al.

(10) Patent No.: US 11,564,065 B2
(45) Date of Patent: Jan. 24, 2023

(54) MULTIMEDIA BROADCAST MULTICAST SERVICE SIGNALING AND BACKWARD COMPATIBILITY

(71) Applicant: QUALCOMM Incorporated, San Diego, CA (US)

(72) Inventors: Umesh Phuyal, San Diego, CA (US); Bharat Shrestha, San Diego, CA (US); Alberto Rico Alvarino, San Diego, CA (US); Luis Fernando Brisson Lopes, Swindon (GB); Ayan Sengupta, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 45 days.

(21) Appl. No.: 17/248,890

(22) Filed: Feb. 11, 2021

(65) Prior Publication Data

US 2021/0258741 A1    Aug. 19, 2021

Related U.S. Application Data

(60) Provisional application No. 62/976,246, filed on Feb. 13, 2020.

(51) Int. Cl.
| | |
|---|---|
| *H04W 4/06* | (2009.01) |
| *H04W 8/22* | (2009.01) |
| *H04W 4/50* | (2018.01) |
| *H04W 76/40* | (2018.01) |
| *H04W 48/12* | (2009.01) |

(52) U.S. Cl.
CPC ............ *H04W 4/06* (2013.01); *H04W 8/22* (2013.01)

(58) Field of Classification Search
CPC ........... H04W 4/06; H04W 8/22; H04W 4/50; H04W 76/40; H04W 48/12; H04L 12/1877; H04L 12/189; H04L 69/24

USPC ......................................................... 370/312
See application file for complete search history.

(56) References Cited

U.S. PATENT DOCUMENTS

| | | | |
|---|---|---|---|
| 2014/0286224 A1* | 9/2014 | Yu .......................... | H04W 4/08 370/312 |
| 2015/0156023 A1* | 6/2015 | Hyun .................... | H04L 9/3247 713/168 |

FOREIGN PATENT DOCUMENTS

| | | | | |
|---|---|---|---|---|
| CN | 103733703 A | * | 4/2014 | ........... H04B 7/2612 |
| WO | WO-2015062712 A1 | * | 5/2015 | .............. H04W 4/06 |
| WO | 2017036328 A1 | | 3/2017 | |

(Continued)

OTHER PUBLICATIONS

International Search Report and Written Opinion—PCT/US2021/017746—ISA/EPO—Jun. 7, 2021.

*Primary Examiner* — Inder P Mehra
(74) *Attorney, Agent, or Firm* — Haynes and Boone, LLP

(57) ABSTRACT

Wireless communication systems and methods related to determining a new multimedia broadcast multicast service (MBMS) configuration for a MBMS that is backward compatible with a legacy MBMS configurations. A base station determines a MBMS configuration. The MBMS configuration includes at least one non-optional field that indicates compatibility with a first user equipment (UE) having a first MBMS capability or compatibility with a second UE having a second MBMS capability. The MBMS configuration also includes a sub-carrier spacing indication for a MBMS corresponding to the first MBMS capability or the second MBMS capability. The MBMS configuration is broadcasted to the first UE and the second UE.

30 Claims, 10 Drawing Sheets

(56) References Cited

FOREIGN PATENT DOCUMENTS

| WO | WO-2017036328 A1 | * | 3/2017 | ............. | H04W 4/06 |
| WO | WO-2021027717 A1 | * | 2/2021 | ........ | H04W 72/1278 |

* cited by examiner

MULTIMEDIA BROADCAST MULTICAST SERVICE SIGNALING AND BACKWARD COMPATIBILITY

CROSS REFERENCE TO RELATED APPLICATIONS

The present application claims priority to and the benefit of the U.S. Provisional Patent Application Nos. 62/976,246, filed Feb. 13, 2020, which is hereby incorporated by reference in its entirety.

TECHNICAL FIELD

This application relates to wireless communication systems, and more particularly to configuring new multimedia broadcast multicast service signaling with backward compatibility.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, the NR is designed to provide a lower latency, a higher bandwidth or a higher throughput, and a higher reliability than the LTE. The NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. The NR is also designed to operate across different spectrum types, including licensed spectrum, unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

As wireless communications evolve, so does signaling, such as radio resource control (RRC) signaling, that the BSs and UEs use to communicate with each other. As the signaling evolves, there is an expectation that the new signaling that the BS transmits to the new UEs be backward compatible with the legacy signaling that the BS transmits to the legacy UEs.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The aspects of the disclosure are directed to a method of wireless communication, comprising determining, at a base station, a multimedia broadcast multicast service (MBMS) configuration, wherein the MBMS configuration includes at least one non-optional field that indicates compatibility with a first user equipment (UE) having a first MBMS capability or compatibility with a second UE having a second MBMS capability, and a sub-carrier spacing indication for an MBMS corresponding to the first MBMS capability or the second MBMS capability, and broadcasting the MBMS configuration to the first UE and the second UE.

The aspects of the disclosure are also directed to a method of wireless communication, comprising receiving, at a second user equipment (UE), a multimedia broadcast multicast service (MBMS) configuration, the MBMS configuration including at least one non-optional field that indicates that a configuration is compatible with a first UE having a first MBMS capability or with the second UE having a second MBMS capability, and a sub-carrier spacing indication for the MBMS corresponding to the first capability or the second capability, determining, using the at least one non-optional field that the configuration is compatible with the second UE, and receiving control information carried by a subframe in a radio frame in the sub-carrier spacing indicated in the configuration for the second UE.

The aspects of the disclosure are also directed to an apparatus for wireless communication, comprising means for determining, at a base station, a multimedia broadcast multicast service (MBMS) configuration, wherein the MBMS configuration includes at least one non-optional field that indicates compatibility with a first user equipment (UE) having a first MBMS capability or compatibility with a second UE having a second MBMS capability, and a sub-carrier spacing indication for the MBMS corresponding to the first MBMS capability or the second MBMS capability, and means for broadcasting the MBMS configuration to the first UE and the second UE The aspects of the disclosure are also directed to an apparatus of wireless communication, comprising means for receiving, at a second user equipment (UE), a multimedia broadcast multicast service (MBMS) configuration, the MBMS configuration including at least one non-optional field that indicates that a configuration is compatible with a first UE having a first MBMS capability or with the second UE having a second MBMS capability, and a sub-carrier spacing indication for the MBMS corresponding to the first capability or the second capability, means for determining, using the at least one non-optional field that the configuration is compatible with the second UE, and means for receiving control information carried by a subframe in a radio frame in the sub-carrier spacing indicated in the configuration for the second UE The aspects of the disclosure are also directed to an apparatus comprising a processor configured to determine, at a base station, a multimedia broadcast multicast service (MBMS) configuration, wherein the MBMS configuration includes at least one non-optional field that indicates compatibility with a first user equipment (UE) having a first MBMS capability or compatibility with a second UE having a second MBMS capability, and a sub-carrier spacing indication for a MBMS corresponding to the first MBMS capability or the second MBMS capability, and a transceiver in communication with the processor and configured to communicate the MBMS configuration to the first UE and the second UE.

The aspects of the disclosure are also directed to an apparatus of wireless communication, comprising a transceiver configured to receive, at a second user equipment (UE), a multimedia broadcast multicast service (MBMS) configuration, the MBMS configuration including at least one non-optional field that indicates that a configuration is compatible with a first UE having a first MBMS capability or with the second UE having a second MBMS capability, and a sub-carrier spacing indication for the MBMS corresponding to the first capability or the second capability, and a processor in communication with receiver and configured to determine, using the at least one non-optional field that the configuration is compatible with the second UE, and receive control information carried by a subframe in a radio frame in the sub-carrier spacing indicated in the configuration for the second UE.

The aspects of the disclosure are also directed to a non-transitory computer-readable medium having program code recorded thereon, the program code comprising code for determining, at a base station, a multimedia broadcast multicast service (MBMS) configuration, wherein the MBMS configuration includes at least one non-optional field that indicates compatibility with a first user equipment (UE) having a first MBMS capability or compatibility with a second UE having a second MBMS capability, and a sub-carrier spacing indication for the MBMS corresponding to the first MBMS capability or the second MBMS capability, and code for broadcasting the MBMS configuration to the first UE and the second UE.

The aspects of the disclosure are also directed to a non-transitory computer-readable medium having program code recorded thereon, the program code comprising code for receiving, at a second user equipment (UE), a multimedia broadcast multicast service (MBMS) configuration, the MBMS configuration including at least one non-optional field that indicates that a configuration is compatible with a first UE having a first MBMS capability or with the second UE having a second MBMS capability, and a sub-carrier spacing indication for the MBMS corresponding to the first capability or the second capability, code for determining, using the at least one non-optional field that the configuration is compatible with the second UE, and code for receiving control information carried by a subframe in a radio frame in the sub-carrier spacing indicated in the configuration for the second UE.

Aspect 1: The disclosure is directed to a method of wireless communication, comprising determining, at a base station, a multimedia broadcast multicast service (MBMS) configuration, wherein the MBMS configuration includes at least one non-optional field with an indication that indicates compatibility of the MBMS configuration with a first user equipment (UE) having a first MBMS capability or with a second UE having a second MBMS capability, and broadcasting the MBMS configuration to the first UE and the second UE.

Aspect 2: The disclosure of aspect 1, wherein the MBMS configuration is broadcasted using is a radio resource control (RRC) signaling.

Aspect 3: The disclosure of any of aspects 1-2, wherein the indication is associated with a sub-carrier spacing in the MBMS configuration, wherein the sub-carrier spacing is different for the first UE and the second UE.

Aspect 4: The disclosure of any of aspects 1-3, wherein the first UE is a legacy UE that uses an older version of the MBMS than the second UE.

Aspect 5: The disclosure of any of aspects 1-4, wherein the determining further comprises configuring all bits of the non-optional field to zero, wherein the all bits set to zero is the indication that the MBMS configuration is associated with the second UE.

Aspect 6: The disclosure of any of aspects 1-5, wherein the determining further comprises configuring the non-optional field with a value that is out of range of expected values or with a value that is not expected by the first UE, wherein the value that is out of range or the value that is not expected indicates that the MBMS configuration is associated with the second UE.

Aspect 7: The disclosure of any of aspects 1-6, wherein the determining further comprises configuring at least one bit in bits of the non-optional field with a one, wherein the at least one bit is the indication that the MBMS configuration is associated with the first UE.

Aspect 8: The disclosure of any of aspects 1-7, wherein the determining further comprises configuring at least one bit in bits of the non-optional field with a one, wherein the at least one bit indicates that a first component of the MBMS configuration is associated with the first UE and a second component of the MBMS configuration is associated with the second UE.

Aspect 9: The disclosure of any of aspect 8, further comprising configuring the first component of the MBMS configuration with a first sub-carrier spacing, and configuring the second component of the MBMS configuration with a second sub-carrier spacing.

Aspect 10: The disclosure of any of aspects 1-7, further comprising receiving an MBMS capability information from the first UE or the second UE, wherein the MBMS capability information is different for the first UE and the second UE, and wherein the determining further comprises determining the MBMS configuration and the indication in the at least one non-optional field based on the MBMS capability information.

Aspect 11: The disclosure of any of aspects 1-7 and 10 wherein the non-optional field is a sf-AllocInfo-r9.

Aspect 12: The disclosure of any of aspects 1-7 and 10-11, wherein the non-optional field specifies an offset for a subframe in a radio frame that carries an MBMS common control information.

Aspect 13: The aspects of the disclosure are directed to a method of wireless communication, comprising receiving, at a user equipment (UE), a multimedia broadcast multicast service (MBMS) configuration, the MBMS configuration including at least one non-optional field that indicates that the MBMS configuration is associated with a first MBMS capability or a second MBMS capability, determining, using the at least one non-optional field, capability of the UE, wherein the capability is the first MBMS capability or the second MBMS capability, determining the MBMS configuration based on the capability, and processing control information according to the MBMS configuration.

Aspect 14: The disclosure of aspect 12, further comprising determining a sub-carrier spacing indicated in the MBMS configuration, and receiving the control information carried by a subframe in a radio frame in a sub-carrier indicated by the sub-carrier spacing.

Aspect 15: The disclosure of any of aspects 13-14, wherein the UE is a legacy UE having the first MBMS capability and processes an older version of an MBMS control information as configured in the MBMS configuration.

Aspect 16: The disclosure of any of aspects 13-15, wherein the UE is a new UE having the first MBMS capability and the second MBMS capability and processes a new version and an older version of an MBMS control information as configured in the MBMS configuration.

Aspect 17: The disclosure of any of aspects 13-16, wherein the UE is a new UE having the second MBMS capability and processes a new version of a MBMS control information as configured in the MBMS configuration.

Aspect 18: The disclosure of any of aspects 13-17, wherein the determining the capability further comprises determining that all bits of the non-optional field are set to a zero, wherein the all bits set to zero indicates that the capability of the UE is the second MBMS capability.

Aspect 19: The disclosure of any of aspects 13-18, further comprising determining a sub-carrier spacing in the MBMS configuration that is associated with the second MBMS capability.

Aspect 20: The disclosure of any of aspects 13-19, wherein the determining further comprises determining that the non-optional field has a value that is out of range of expected values or a value is unexpected to the UE, wherein the value that is out of the range of expected values or is unexpected to the UE indicates that the MBMS configuration is associated with the UE that has the second MBMS capability.

Aspect 21: The disclosure of any of aspects 13-20, wherein the determining further comprises determining that at least one bit in bits of the non-optional field is set to one, wherein the at least one bit that is set to one indicates that the capability of the UE is the first MBMS capability.

Aspect 22: The disclosure of any of aspects 13-21, wherein the determining further comprises determining that at least one bit in bits of the non-optional field is set to one, wherein the at least one bit set to one indicates that the capability of the UE is the first MBMS capability or the second MBMS capability, and selecting the capability from the first MBMS capability or the second MBMS capability.

Aspect 23: The disclosure of any of aspects 13-22, further comprising, transmitting an MBMS capability information from the UE, wherein the MBMS capability information indicates the second MBMS capability, and in response to the transmitting, receiving, at the UE, the MBMS configuration including the non-optional field that indicates that the MBMS configuration is compatible with the second MBMS capability.

Aspect 24: Aspects of the disclosure are directed to an apparatus for wireless communication, comprising a processor configured to determine, at a base station, a multimedia broadcast multicast service (MBMS) configuration, wherein the MBMS configuration includes at least one non-optional field that indicates compatibility with a first user equipment (UE) having a first MBMS capability or compatibility with a second UE having a second MBMS capability, and an indication in the non-optional field that indicates that the MBMS configuration corresponds to the first MBMS capability or the second MBMS capability, and a transceiver in communication with the processor and configured to communicate the MBMS configuration to the first UE and the second UE.

Aspect 25: The disclosure of aspect 24, wherein the processor is further configured to set all bits of the non-optional field to zero, wherein the all bits set to zero indicate that the MBMS configuration is associated with the second UE.

Aspect 26: The disclosure of aspect 25, wherein the processor is further configured to configure a sub-carrier spacing in the MBMS configuration for the second UE.

Aspect 27: The disclosure of any of the aspects 24-25, wherein the processor is further configured to configure at least one bit in bits of the non-optional field with a one, wherein the at least one bit indicates that the MBMS configuration is associated with the first UE.

Aspect 28: The disclosure of any of the aspects 24-25 and 27, wherein the processor is further configured to configure at least one bit in bits of the non-optional field with a one, wherein the at least one bit indicates that a first component of the MBMS configuration is associated with the first UE and a second component of MBMS configuration is associated with the second UE.

Aspect 29: The disclosure of aspect 28, wherein the processor is further configured to configure the first component of the MBMS configuration with a first sub-carrier spacing, and configure the second component of the MBMS configuration with a second sub-carrier spacing.

Aspect 30: Aspects of the disclosure are directed to an apparatus of wireless communication, comprising a transceiver configured to receive, at a user equipment (UE), a multimedia broadcast multicast service (MBMS) configuration, the MBMS configuration including at least one non-optional field that indicates whether the MBMS configuration is associated with a first MBMS capability or a second MBMS capability, and a processor in communication with receiver and configured to determine, using the at least one non-optional field, capability of the UE, wherein the capability is the first MBMS capability or the second MBMS capability, determine the MBMS configuration based on the capability, and processing control information received at the UE according to the MBMS configuration.

DETAILED DESCRIPTION

Figure 1:
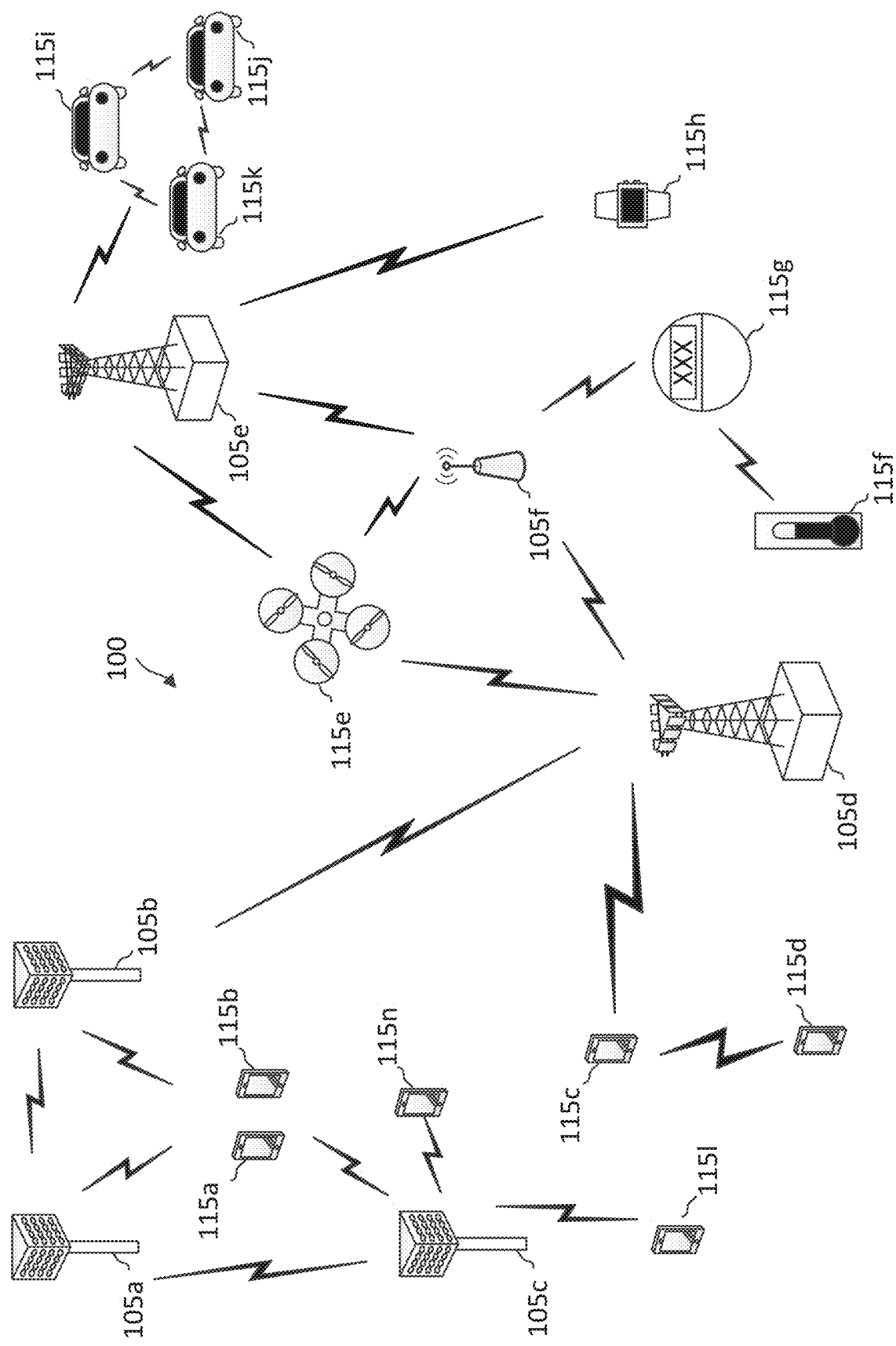
FIG. 1 illustrates a wireless communication network, according to embodiments the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^1$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM (orthogonal frequency division multiplexing) and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., 10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As wireless communications evolve, so does the control signaling, such as radio resource control (RRC) signaling between a base station (BS) and user equipments (UEs). Because certain fields in the signal configuration are required, these fields must be present in different versions of the control signaling for backward compatibility. At the same time, the new control signaling that is received by the new UEs should not be able to activate or enable the features in the older or legacy UEs. Similarly, the legacy control signaling that is received by the legacy or old UEs should not be able to activate features in the new UEs. Example features may be different sub-carrier spacing for sub-carriers that are used by the legacy and new multimedia broadcast multicast service (MBMS). When the new signaling activates the features in the legacy UE or vice versa, the UEs may exhibit unexpected behavior and generate unintended errors. The aspects below describe techniques for configuring new control signaling for new UEs with backward compatibility for the legacy UEs.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V (vehicle-to-vehicle), V2X (vehicle-to-everything), C-V2X (cellular-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into sub-bands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OS. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ (hybrid automatic repeat request) techniques to improve communication reliability, for example, to provide a URLLC (ultra-reliable low-latency communication) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK (acknowledgment) to the BS 105. Conversely, if the UE 115 fails to receive the DL transmission successfully, the UE 115 may transmit a HARQ NACK (negative acknowledgement) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. A TXOP may also be referred to as channel occupancy time (COT).

In some aspects, network 100 may communicate with UEs 115 that communicate using different versions of the control signaling, such as radio resource control (RRC) signaling. The UEs 115 that receive the new or latest RRC signaling from the BS 105 may be referred to as new UEs 115n and UEs 115 that receive an older or legacy RRC signaling may be referred to as old or legacy UEs 115l. In some cases, the RRC signaling may include control information for configuring the multimedia broadcast multicast service (MBMS). The MBMS is a service that transmits data packets to multiple users at the same time and that is used for efficient delivery of broadcast or multicast services. Although the aspects below are discussed with respect to configuring and processing backward compatible new and legacy RRC signaling that provides control information for the MBMS, the aspects are also applicable to other types of control signaling. Further, it is desirable for the new signaling to enable the new MBMS without enabling the features of the legacy MBMS and vice versa.

As discussed above, the UEs 115 may receive RRC signals from BS 105. The RRC signals may carry control information related to the MBMS. The MBMS control information may be provided on the multicast control channel or MCCH. The BS 105 may use one MCCH per multicast-broadcast single-frequency network (MBSFN) area. In some instances, UE 115 may receive an MBSFN-AreaInfoList information element from BS 105 that contains information that UE 115 requires to acquire from the MBMS control information associated with one or more MBSFN areas. The AreaInfoList information element may be included in the RRC signals.

Figure 2:
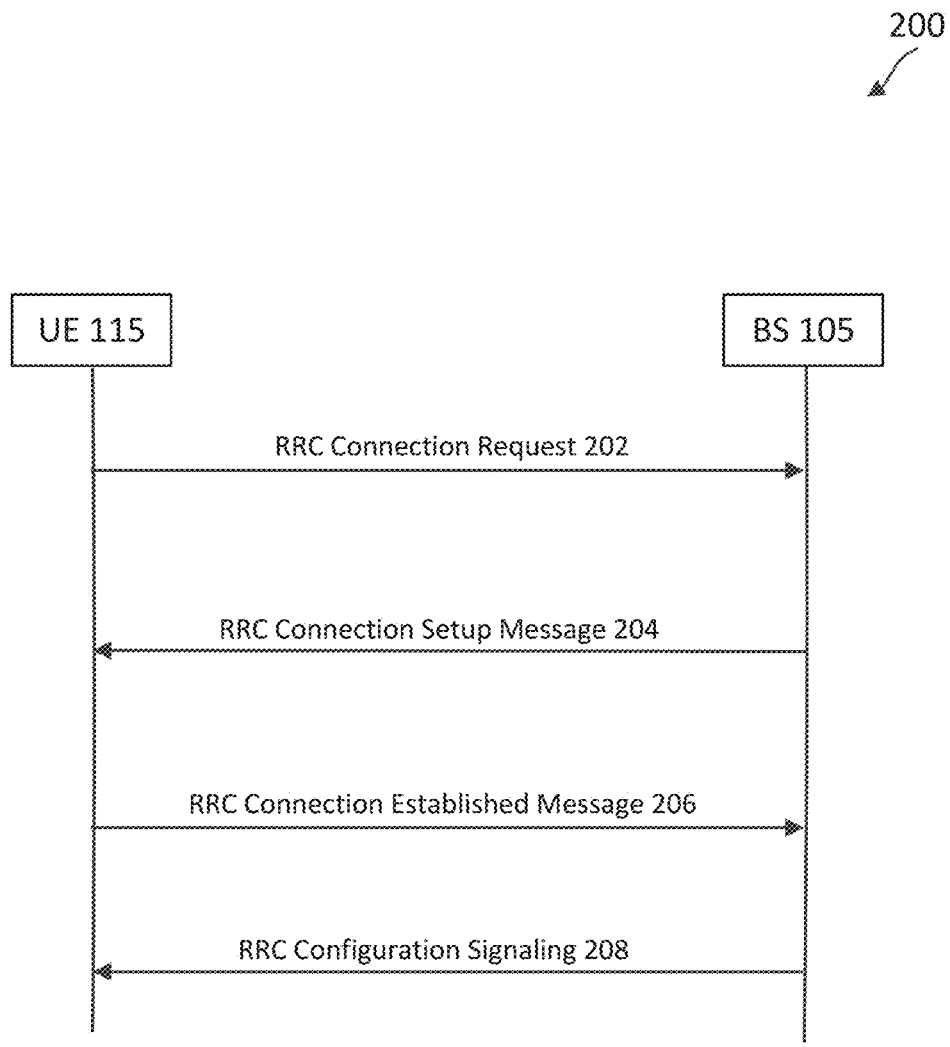
FIG. 2 illustrates a base station transmitting radio resource control (RRC) signaling, according to aspects of the disclosure.

FIG. 2 is a diagram 200 illustrating a base station transmitting the RRC signaling to a user equipment, according to aspects of the disclosure. As illustrated in diagram, UE 115 makes an RRC connection request 202 to BS 105. In response to the RRC connection request 202, BS 105 may transmit an RRC connection setup message 204 to UE 115. Once UE 115 receives and processes the RRC connection setup message 204, UE 115 enters into the RRC connection mode and transmits the RRC connection established message 206 to BS 105. Subsequent to the RRC connection established message 206, UE 115 may receive RRC signaling 208 from BS 105.

As MBMSs evolve, so does the RRC signaling that BS 105 transmits to UEs 115 and that UEs 115 use to set-up and configure the MBMSs. As part of the new signaling configuration for the RRC signaling, the BS 105 may specify new numerologies for the physical multicast channel (PMCH) which includes enhanced physical channels and signals in the cell-acquisition subframe (CAS). Accordingly, the new numerologies for the PMCH may have different sub-carrier spacing than the PMCH numerologies in the legacy MBMS. There is an expectation, however, for the new signaling configuration to be backward compatible and to be added to the RRC signaling in a way that the new signaling configuration does not disrupt the legacy RRC signaling for the legacy physical channels. This is because the new signaling may be used by the new UEs 115n that may set up the new MBMS while the legacy signaling may be used by the legacy UEs 115l that may set up the legacy MBMS. Thus, it is desirable for BS 105 to generate the RRC signals that include the new signaling configuration for the new UEs 115n and legacy signaling configuration for the legacy UEs 115l. Further, it is desirable for the new UEs 115n to be backwards compatible and be able to process the RRC signaling that includes the new signaling configurations for enhanced physical channels for MBMS without enabling the legacy features in the MBMS. Correspondingly, there is an expectation for the legacy UEs 115l configured for legacy RRC signaling to be able to identify the RRC signaling that includes the legacy signaling configuration and also identify and ignore the RRC signaling that includes the new signaling configuration. This is because the new MBMS with new sub-carrier spacing may not work with legacy UEs 115*l*.

The signaling configuration carried by the RRC signaling may have mandatory or non-optional fields. The mandatory or non-optional fields may carry MBMS control information. This control information may be common to different versions of the MBMS. For the RRC signaling to be backwards compatible, these fields exist in the new and legacy signaling configurations. However, simply leaving the mandatory fields and adding new fields to the new signaling configuration may not solve the backward compatibility issue for signaling configurations between the legacy UEs 115*l* and new UEs 115*n*. This is because the fields in the RRC signaling that are specific to the new UE 115*n* can be processed by the legacy UE 115*l*, and the legacy UE 115*l* may assume MBMS functionality that is either erroneous or incompatible with the legacy UE 115*l*.

To make the new signaling configuration backward compatible, BS 105 may use a combination of a legacy configuration and a new configuration in the new signaling configuration. For example, the BS 105 may identify a non-optional field in the legacy configuration which the legacy UE 115*l* may decode without an error. However, the BS 105 may include a value in the non-optional field that may indicate a configuration error to the legacy UE 115*l* that causes the legacy UE 115*l* to ignore the new signaling configuration. An example value that indicates an error may be a value that has all bits set to zero, a value that is outside of an expected value range, etc. In this way, when the legacy UE 115*l* receives the RRC signaling that includes the legacy configuration and the new configuration, the legacy UE 115*l* may decode the non-optional field and based on its value determine that the RRC signaling is to be ignored. Thus, if the legacy UE 115*l* receives the RRC signaling that includes the set-up for the new MBMS, the legacy UE 115*l* may not set up or configure the MBMS service.

In addition to the non-optional field in the legacy configuration, the BS 105 may also create a separate new configuration for the new UE 115*n* and add the new configuration to the new signaling configuration included in the RRC signaling. Thus, the new signaling configuration includes a legacy configuration with a non-optional field and a new configuration. While including the non-optional field in the signaling configuration causes the signaling configuration to be in a format that is backward compatible with the legacy UE 115*l*, when the new UE 115*n* receives the new signaling configuration, the value in the non-optional field indicates to UE 115*n* to decode the new signaling configuration. The BS 105 encodes the non-optional field with a value that indicates that the new UE 115*n* may process the new configuration included in the new signaling configuration while the legacy UE 115*l* may ignore the new signaling configuration. In this way, when the legacy UE 115*l* receives the new signaling configuration, the legacy UE 115*l* may decode the non-optional field with a value that indicates that the configuration is to be ignored and does not decode the new configuration. However, when the new UE 115*n* receives the new signaling configuration, the new UE 115*n* may decode both the non-optional field in the legacy configuration and the new configuration. If the new signaling configuration includes a set-up for a new MBMS service, the new UE 115*n* may set up the new MBMS service upon decoding the new signaling configuration.

The aspects above may be further illustrated using an MBSFN-AreaInfoList information element (JE) that BS 105 includes in the RRC signaling to set up the MBMS with the UE 115. The MBSFN-AreaInfoList IE contains information required to acquire the MBMS control information associated with one or more MBSFN areas. The BS 105 may generate the MBSFN-AreaInfoList IE as part of an RRC signal broadcast transmission to UEs 115. Both new UEs 115*n* and legacy UEs 115*l* may receive the broadcast transmission with the MBSFN-AreaInfoList IE included in the RRC signaling.

Figure 3A:
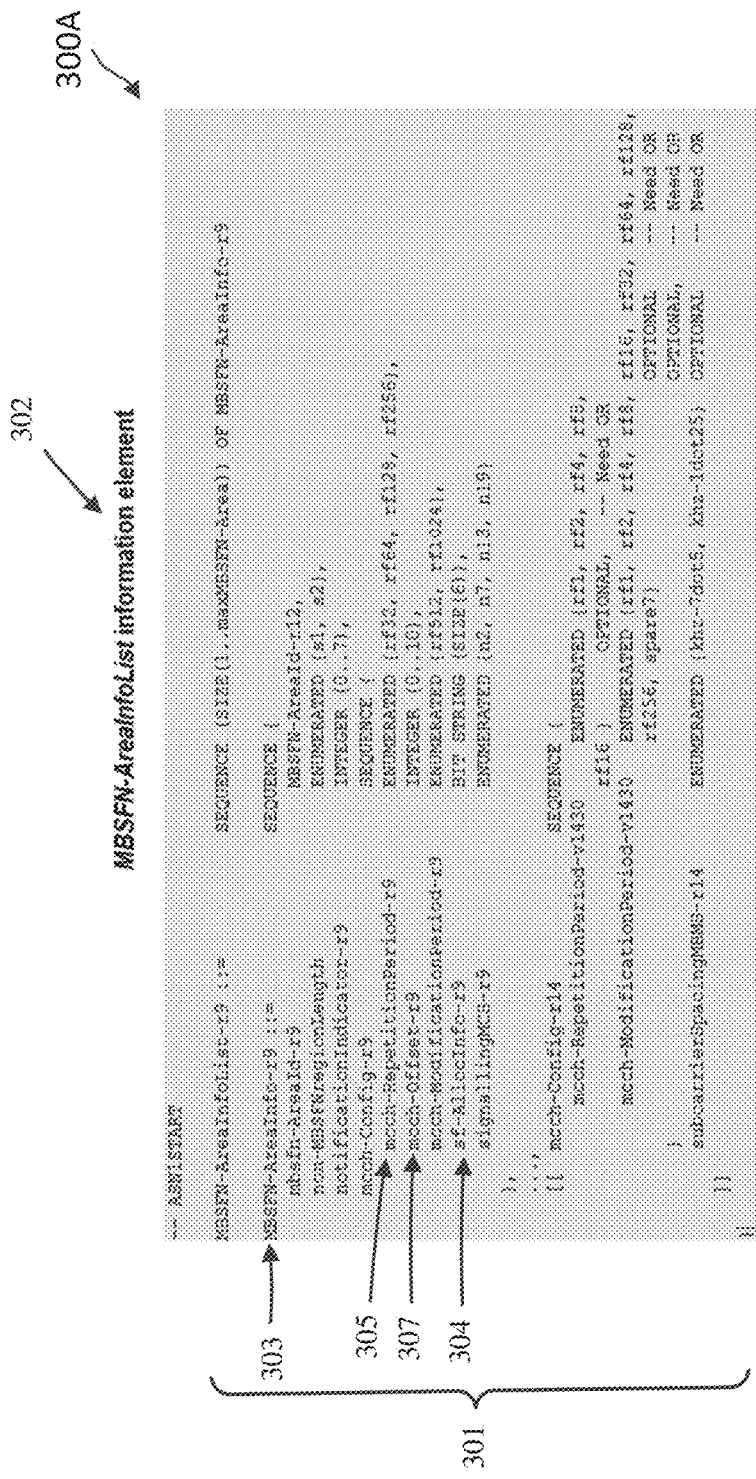
FIGS. 3A and 3B illustrate legacy and new configurations to be included in the RRC signaling, according to aspects of the disclosure.

FIG. 3A is a diagram 300A that illustrates a legacy MBSFN-AreaInfoList information element according to aspects of the disclosure. The MBSFN-AreaInfoList IE in FIG. 3A is a MBSFN-AreaInfoList-r9 IE 302 which includes a legacy MBSFN-AreaInfoList-r9 configuration 301 that is associated with a software release 9. The MBSFN-AreaInfoList-r9 configuration 301 may be referred to as the legacy MBMS configuration. The MBSFN-AreaInfoList-r9 configuration 301 is a mandatory configuration and must include a number of non-zero elements, where each element is defined by a MBSFN-AreaInfo-r9 configuration 303. The MBSFN-AreaInfo-r9 configuration 303 includes a mandatory or non-optional sf-AllocInfo-r9 field 304. The sf-AllocInfo-r9 field 304 may specify the subframes of the radio frame that may carry the MCCH. In particular, the sf-AllocInfo-r9 field 304 may indicate the subframes of the radio frames indicated by a mcch-RepetitionPeriod field 305 and a mcch-Offset-r9 field 307. The sf-AllocInfo-r9 field 304 may include one or more bits that can be configured with "0" or "1" values. The value "1" indicates that the corresponding subframe is allocated. In one aspect of the disclosure, all bits in sf-AllocInfo-r9 field 304 may be set to zero. In this case, the corresponding MBSFN area is considered to be not configured and may not carry the MCCH.

Because MBSFN-AreaInfoList-r9 configuration 301 is mandatory or non-optional, the MBSFN-AreaInfoList-r9 configuration 301 may be included in the new signaling configuration for the MBMS service. An example new signaling configuration may be a release 16, where the release 16 is a new software version of the older or legacy release 9. To make the MBSFN-AreaInfoList-r9 configuration 301 backward compatible in the new signaling configuration for the MBMS service, the BS 105 may include one or more elements MBSFN-AreaInfo-r9 configuration 303 and, in each included element, set all bits in the sf-AllocInfo-r9 field 304 to zero. In this case, the sf-AllocInfo-r9 field 304 is an indicator that indicates whether the legacy signaling configuration or a new signaling configuration may be used. When all bits in sf-AllocInfo-r9 field 304 are set to zero, the legacy UE 115*l* may decode the sf-AllocInfo-r9 field 304 without an error, but based on the zero values in all bit locations may determine that the configuration should not be used because the MBSFN area is not configured. Thus, the legacy UE 115*l* may not receive the MBMS service as there is no subframe for MCCH. In this way, the legacy UE 115*l* receiving the MBSFN-AreaInfoList-r9 IE 302 as part of the new signaling configuration may process the MBSFN-AreaInfoList-r9 IE 302 but may not receive the MBMS service when all bits in sf-AllocInfo-r9 field 304 are set to zero. Accordingly, FIG. 3A illustrates that MBSFN-AreaInfoList-r9 configuration 301 is a legacy configuration and sf-AllocInfo-r9 field 304 is a non-optional field which may indicate to the legacy UE 115*l* to not set up the MBMS.

Figure 3B:
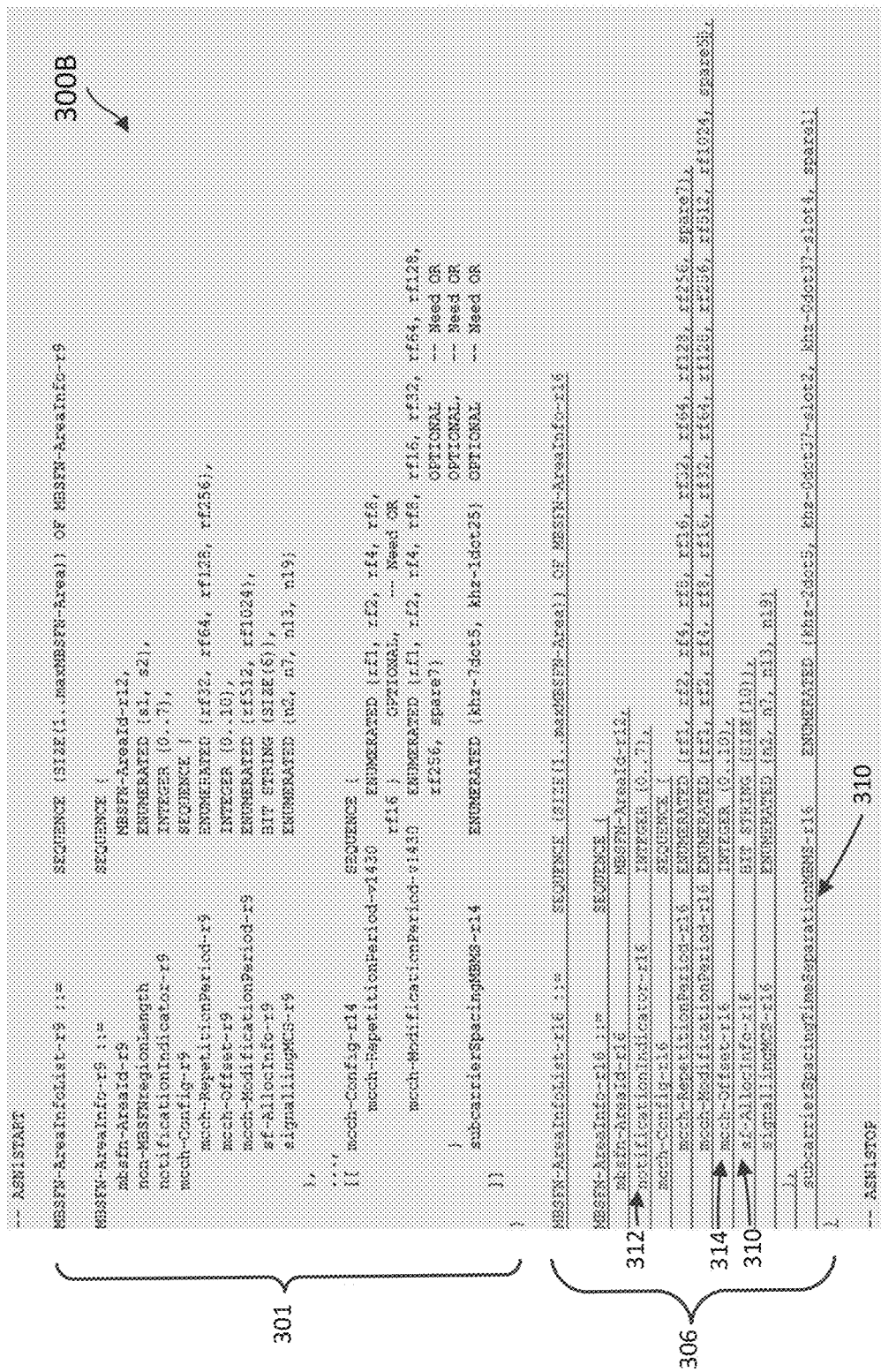

To determine a new signaling configuration for new UE 115*n*, BS 105 in addition to setting all bits in the sf-AllocInfo-r9 field 304 to zero in the MBSFN-AreaInfoListr9 configuration 301, may also define a new configuration, such as MBSFN-AreaInfoList-r16 configuration. MBSFN-AreaInfoList-r16 configuration may include new signaling and may be decoded by the new UEs 115n, but ignored by legacy UE 115l. FIG. 3B is a diagram 300B that illustrates an MBSFN-AreaInfoList information element with a legacy MBSFN-AreaInfoList-r9 configuration and a new MBSFN-AreaInfoList-r16 configuration, according to aspects of the disclosure. In FIG. 3B the new MBMS configuration may include the MBSFN-AreaInfoList-r9 configuration 301 and a new MBSFN-AreaInfoList-r16 configuration 306. The MBSFN-AreaInfoList-r9 configuration 301 is a legacy configuration and MBSFN-AreaInfoList-r16 306 is a new configuration. The MBSFN-AreaInfoList-r16 configuration 306 may include sf-AllocInfo-r16 field 308 and subcarrierSpacingTimeSeparationMBMS-r16 field 310. Notably the names of the fields 308 and 310 are exemplary for purpose of the aspects described herein. The MBSFN-AreaInfoList-r16 configuration 306 may indicate the subframes of the radio frames indicated by the mcch-RepetitionPeriod-r16 field 312 and the mcch-Offset-r16 filed 314 that may carry MCCH, where value "1" indicates that the corresponding subframe is allocated. Further, in one example, the first or leftmost bit may define the allocation for subframe #0 of the radio frame indicated by the mcch-RepetitioPeriod-r16 field 312 and mcch-Offset-r16 field 314, the second or the second leftmost bit may define allocation for subframe #1 of the radio subframe, and so on. The allocation of subframes may also be defined in other ways, e.g. the last or rightmost bit may define the allocation for subframe #0, etc. The subcarrierSpacingTimeSeparationMBMS-r16 field 310 or a similar field may indicate for the MBSFN subframes, subcarrier spacing and for the 0.370 kHz subcarrier spacing additionally indicate the staggering length for the MBSFN-RS (MBSFN reference signal) associated with the PMCH. Further, the value khz-2dot5 may refer to 2.5 kHz subcarrier spacing, khz-0.370-slot2 refers to the 0.370 kHz subcarrier spacing with staggering length of 2 slots and khz-0.370-slot4 refers to the 0.370 kHz subcarrier spacing with staggering length of 4 slots. Alternatively, separate fields may be defined to indicate the subcarrier spacing and staggering length for the MBSFN-RS associated with the PMCH.

The BS 105 may encode the MBSFN-AreaInfoList-r9 configuration 301 for setting up the MBMS on the legacy UE 115l. In this case, BS 105 may set bits in sf-AllocInfo-r9 field 304 to values that may be processed by the legacy UE 115l, such as bits that are a combination of zeros and ones, or all ones.

BS 105 may also encode MBSFN-AreaInfoList-r9 configuration 301 and MBSFN-AreaInfoList-r16 configuration 306 for setting up the MBMS for the new UE 115n. When BS 105 encodes MBSFN-AreaInfoList-r16 configuration 306, BS 105 may also encode MBSFN-AreaInfoList-r9 configuration 301 and set all bits in sf-AllocInfo-r9 field 304 to zero. In this way, when the legacy UE 115l receives the new signaling configuration that includes MBSFN-AreaInfoList-r9 configuration 301 and MBSFN-AreaInfoList-r16 configuration 306, the legacy UE 115l may receive, properly decode, and determine that all bits in sf-AllocInfo-r9 field 304 are set to zero. In this case, legacy UE 115L may ignore the MBSFN-AreaInfoList-r9 configuration 301 and MBSFN-AreaInfoList-r16 configuration 306 because the non-optional field sf-AllocInfo-r9 field 304 indicates that all bits are set to zero. However, when the new UE 115n receives the new signaling configuration that includes MBSFN-AreaInfoList-r9 configuration 301 and MBSFN-AreaInfoList-r16 configuration 306, the new UE 115n may properly decode the non-optional field sf-AllocInfo-r9 field 304 that indicates that all bits are set to zero. In this case, the new UE 115h may use the MBSFN-AreaInfoList-r16 configuration 306 to set up the MBMS.

In some aspects, BS 105 may encode the encode MBSFN-AreaInfoList-r9 configuration 301 and MBSFN-AreaInfoList-r16 configuration 306 and also set bits in sf-AllocInfo-r9 field 304 to values that are a combination of zeros and ones, or all ones. In this case, the legacy UE 115l may receive, properly decode, and process the legacy signaling configuration included in MBSFN-AreaInfoList-r9 configuration because the values in the sf-AllocInfo-r9 field indicate a valid legacy signaling configuration. The new UE 115n may also receive and properly decode the sf-AllocInfo-r9 field. Because the sf-AllocInfo-r9 field indicates a valid legacy signaling and the new UE 115n receives both MBSFN-AreaInfoList-r9 configuration 301 and MBSFN-AreaInfoList-r16 configuration 306, the new UE 115n may select whether to use the legacy signaling configuration included in MBSFN-AreaInfoList-r9 configuration 301 or the new signaling configuration included in MBSFN-AreaInfoList-r16 configuration 306.

As discussed in FIG. 3A, the BS 105 may set all bits of sf-AllocInfo-r9 field 304 to zero in the new signaling configuration to indicate to the legacy UE 115 to ignore the new signaling configuration. BS 105, however, is not limited to this implementation, and may also use other fields and values to indicate a new signaling configuration to the legacy UE 115. In another example, BS 105 may encode a non-optional field in the MBSFN-AreaInfoList-r9 configuration 301 with a value that is outside of a specified value range or an unexpected value as an indication to use the new signaling configuration. The unexpected values may be values that are not defined to be associated with MBSFN-AreaInfoList-r9 configuration 301. When the value of the field is outside of the specified range or is unexpected, the legacy UE 115l may also correctly decode the field, determine that the field is set to a wrong value, and ignore the new signaling configuration. On the other hand, the new UE 115n may encounter the non-optional field in the MBSFN-AreaInfoList-r9 configuration 301 and continue to decode the new signaling configuration, e.g. MBSFN-AreaInfoList-r16 configuration 306 shown in FIG. 3B to set-up the MBMS. One example non-optional field that may store an out-of-range value may be mcch-Offset-r9 field 307 shown in FIG. 3A. The BS 105 may indicate that mcch-Offset-r9 field 307 may have values between zero and ten. However, when BS 105 encodes the new configuration for the new UE 115 that includes the MBSFN-AreaInfoList-r9 configuration 301 and MBSFN-AreaInfoList-r16 configuration 306, BS 105 may set the value of mcch-Offset-r9 field 307 to eleven or another value that is outside of the specified range of values between zero and ten. When the new UE 115n receives a new configuration signaling that includes the legacy MBSFN-AreaInfoList-r9 configuration 301 with the mcch-Offset-r9 field 307 set to eleven or another value outside of the range of valid values and the new MBSFN-AreaInfoList-r16 configuration 306, the new UE 115n may ignore the legacy MBSFN-AreaInfoList-r9 configuration 301 which includes mcch-Offset-r9 field 307 with a value eleven and use the MBSFN-AreaInfoList-r16 configuration 306 to set up the MBMS.

When the legacy UE 115l receives the new signaling configuration that includes MBSFN-AreaInfoList-r9 configuration 301 with mcch-Offset-r9 set to eleven or another value outside of the range of valid values and the MBSFN-AreaInfoList-r16 configuration 306, the legacy UE 115l may decode the mcch-Offset-r9 with a value set to eleven which indicates to the legacy UE 115*l* to ignore the MBMS signaling configuration. Thus, the legacy UE 115*l* may ignore the rest of the MBSFN-AreaInfoList-r9 configuration 301 and MBSFN-AreaInfoList-r16 configuration 306. When the legacy UE 115*l* receives the MBSFN-AreaInfoList-r9 configuration 301 with the mcch-Offset-r9 field 307 set to a value between zero and 10, the legacy UE 115*l* may establish the legacy MBMS using the MBSFN-AreaInfoList-r9 configuration 301. When the new UE 115*n* receives the MBSFN-AreaInfoList-r9 configuration 301 with the mcch-Offset-r9 field 307 set to a value between zero and 10 and the MBSFN-AreaInfoList-r16 configuration 306, the new UE 115*n* apply both the legacy and new signaling configurations within the respective MBSFN areas, provided the legacy and new configurations are valid otherwise.

In some aspects, the legacy UE 115*l* or the new UE 115*n* may transmit capability information of the respective UE 115 to BS 105. The UE 115 may transmit the capability information in the unicast or directed groupcast transmissions. Based on the capability of the UE 115, BS 105 may determine the legacy or new signaling configuration and transmit the RRC signaling that includes the legacy or the new signaling configuration to UE 115. Accordingly, if BS 105 receives the capability information of the legacy UE 115*l*, the BS 105 may configure the legacy configuration signaling and transmit the legacy configuration signaling to the legacy UE 115*l*. The legacy signaling may have the legacy subcarrier spacing. On the other hand, if the BS 105 receives the capability information from the new UE 115, the BS 105 may configure a new signaling configuration that includes the non-optional field in the legacy configuration with e.g. all bits set to zero or an out of range value, and a new configuration. The BS 105 may then transmit the new signaling configuration to the new UE 115*n*.

Figure 3C:
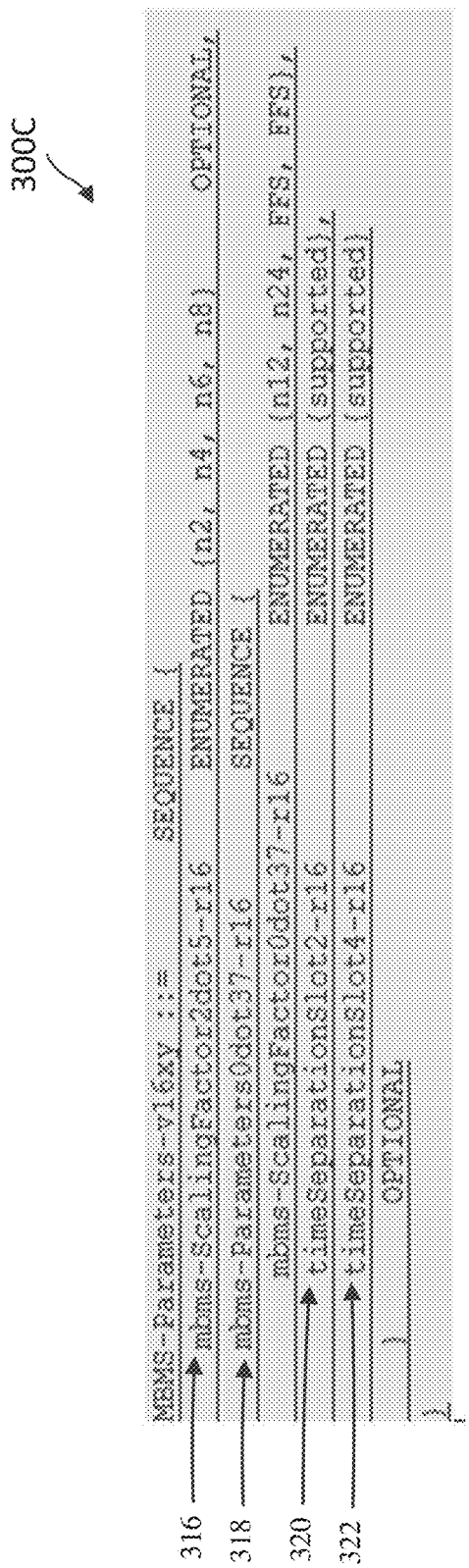
FIG. 3C illustrates a user equipment capability information, according to aspects of the disclosure.

FIG. 3C is a diagram 300C that indicates a capability information message, according to aspects of the disclosure. The capabilities information message may include an mbms-ScalingFactor0dot37 field 316, an mbms-ScalingFactor2dot5 field 318, a timeSeparation-Slot2 field 320 and a timeSeparation-Slot4 field 322. The mbms-ScalingFactor0dot37 field 316 and mbms-ScalingFactor2dot5 field 318 indicate that the UE 115 supports the subcarrier spacing of 0.37 kHz/2.5 kHz for MBSFN subframes. Further the values of the mbms-ScalingFactor0dot37 field 316 and mbms-ScalingFactor2dot5 field 318 may indicate a scaling factor for processing one unit of bandwidth corresponding to the subcarrier spacing of 0.37 kHz/2.5 kHz with respect to one unit of bandwidth corresponding to subcarrier spacing of 15 kHz.

The timeSeparation-Slot2 field 320 and timeSeparation-Slot4 field 322 may indicate whether the UE 115 supports time staggering lengths of 2 or 4 slots for PMCH with the subcarrier spacing of 0.37 kHz for MBSFN subframes.

In some aspects, the UE 115 may transmit its capability information prior to BS 105 generating the legacy configuration signaling or the new configuration signaling for, e.g. setting up the MBMS. In response, BS 105 may generate transmit the legacy configuration signaling or the new configuration signaling for the MBMS based on the capability information.

Notably, while the aspects above are described with respect to the signaling that establishes backward compatibility for the MBMS, the embodiments are also applicable to establishing backward compatibility for other types of signaling.

Figure 4:
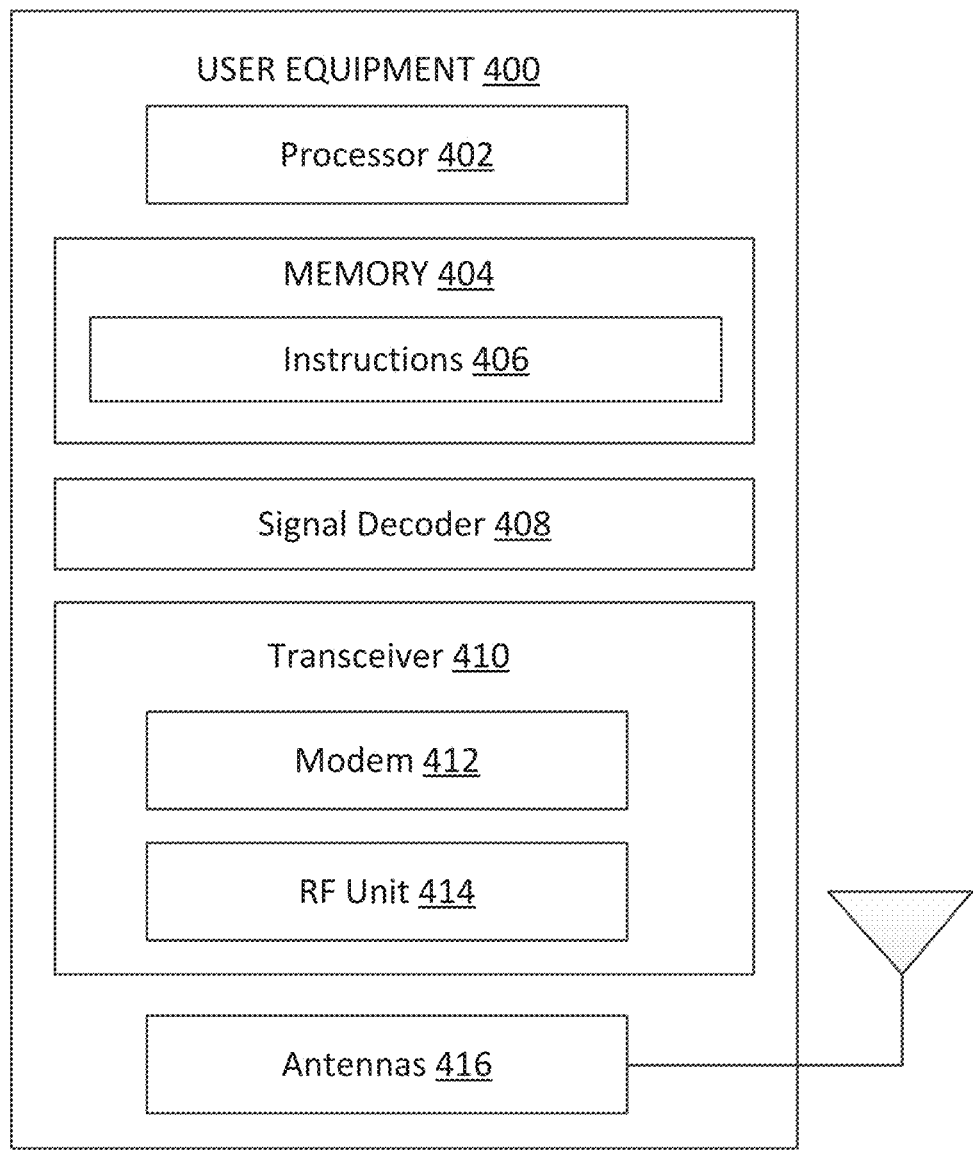
FIG. 4 is a block diagram of an exemplary user equipment (UE), according to aspects of the disclosure.

FIG. 4 is a block diagram of an exemplary UE 400 according to embodiments of the present disclosure. As shown, the UE 400 may include a processor 402, a memory 404, signal decoder 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some aspects, the memory 404 includes a non-transitory computer-readable medium. The memory 404 may store instructions 406. The instructions 406 may include instructions that, when executed by the processor 402, cause the processor 402 to perform the operations described herein with reference to the UEs 400 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The signal decoder 408 may be used for various aspects of the disclosure. Signal decoder 408 may decode signaling configurations, including signaling configurations included in the RRC signaling and associated with the MBMS service. In particular, signal decoder 408 may decode signaling configuration, such as MBMS legacy and MBMS new configurations for both legacy and new UEs 115*l*, 115*n*.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 510, the modem subsystem 412 and the RF unit 414 may be separate devices that are coupled together at the UE 400, including UE 115*l*, 115*n* to enable the UE 400 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of the capability information and MBMS data according to embodiments of the present disclosure. The antennas 416 may further receive data messages transmitted from other devices. This may include, for example, reception of the legacy and new signaling configuration for the MBMS that is included in the RRC signaling. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
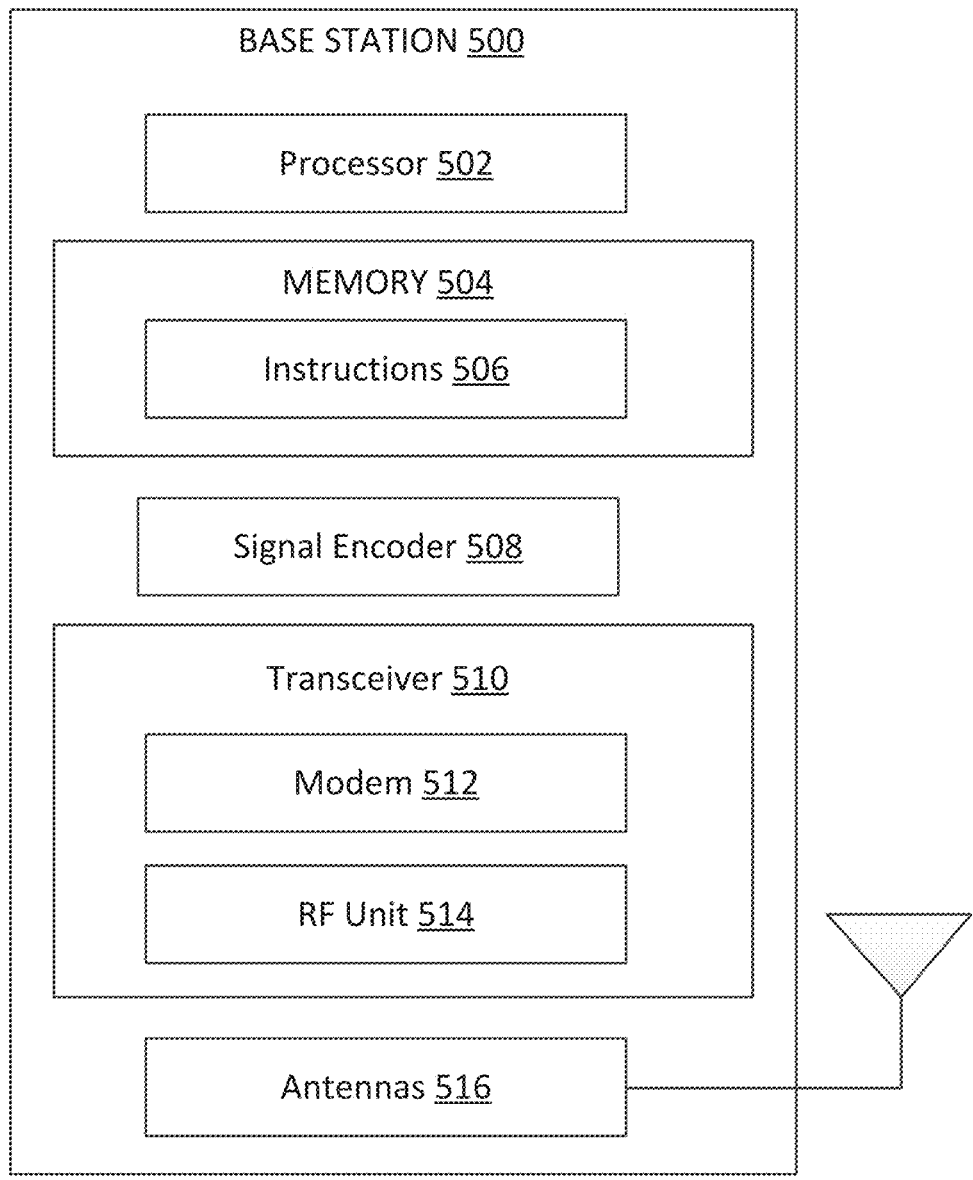
FIG. 5 is a block diagram of an exemplary base station (BS), according to aspects of the disclosure.

FIG. 5 is a block diagram of an exemplary BS 500 according to embodiments of the present disclosure. The BS 500 may be a BS 105 as discussed above. A shown, the BS 500 may include a processor 502, a memory 504, signal encoder 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The signal encoder 508 may be used for various aspects of the disclosure. Signal decoder 508 may encode signaling configurations to be included in the RRC signaling, including signaling configurations for the MBMS that are transmitted using uncast transmission, broadcast transmission, or groupcast transmission to UEs 115, 400. In particular, signal decoder 508 may encode signaling configurations, e.g. MBMS legacy and MBMS new configurations for both legacy and new UEs 115*n*, 115*l* and may include backward capability for signaling configurations.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 400 and also transmission of the legacy and/or new signaling configuration for the MBMS service, according to embodiments of the present disclosure. The antennas 516 may further receive data messages transmitted from other devices, including capability information from the UE 400 and provide the received data messages for processing and/or demodulation at the transceiver 510. The antennas 516 may include multiple antennas of similar or different designs in order to sustain multiple transmission links.

Figure 6:
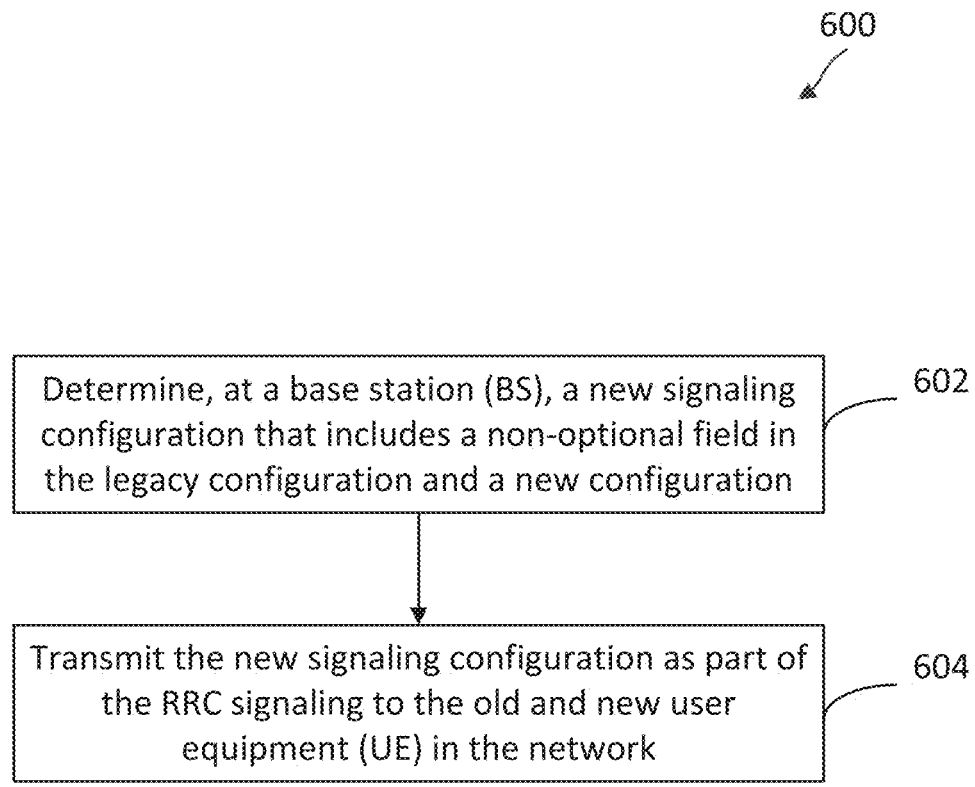
FIG. 6 is a flow diagram of a BS transmitting new RRC signaling to a new user equipment (UE) that is backward compatible for a legacy user equipment (UE), according to aspects of the disclosure.

FIG. 6 is a flow diagram of a method 600 according to some aspects of the disclosure. Steps of the method 600 can be executed by a computing device (e.g., a processor, processing circuit, and/or other suitable component) of a wireless communication device or other suitable means for performing the steps. For example, a wireless communication device, such as the BS 105 may utilize one or more components, such as the processor 502, the signal encoder 508, the transceiver 510, the modem 512, and the one or more antennas 516, to execute the steps of method 600. As illustrated, the method 600 includes a number of enumerated steps, but aspects of the method 600 may include additional steps before, after, and in between the enumerated steps. In some aspects, one or more of the enumerated steps may be omitted or performed in a different order.

At step 602, a new signaling configuration with backward compatibility is determined. The new signaling configuration is included in the RRC signaling to set up the MBMS. The new signaling configuration may be the new MBMS configuration that sets up the MBMS. BS 105 determines a new signaling configuration for the new UE 115*n* that is backward compatible with the legacy configuration for the legacy UE 115*l*. The new signaling configuration includes the legacy configuration (legacy MBMS configuration) with information in a mandatory or non-optional field and a new configuration. BS 105 identifies the mandatory or non-optional field in the legacy configuration and includes a value in the mandatory or non-optional field that causes the legacy UE 115*l* to decode the legacy configuration correctly but to ignore the configuration. An example non-optional field may have a value with all bits set to zero, value that is out of range from available values, or another value that may be decoded correctly but indicates to the legacy UE 115*l* to ignore the configuration and, for example, to ignore setting up the new MBMS that has new sub-carrier spacing on the legacy UE 115*l*. BS 105 also includes a new configuration in the new signaling configuration. The new configuration may be decoded by the new UE 115*n* to, for example, establish an MBMS. An example new signaling configuration may indicate new sub-carrier spacing used in the MBMS by the new UE 115*n*.

At step 604, the new signaling configuration is transmitted. For example, BS 105 may transmit the new signaling configuration, including the legacy configuration with a set mandatory or non-optional field and the new configuration. The signaling configuration may be included as part of the RRC signaling to the new and legacy UEs 115*n*, 115*l* in the network 100. The transmission may be a broadcast transmission, groupcast transmission or unicast transmission.

Figure 7:
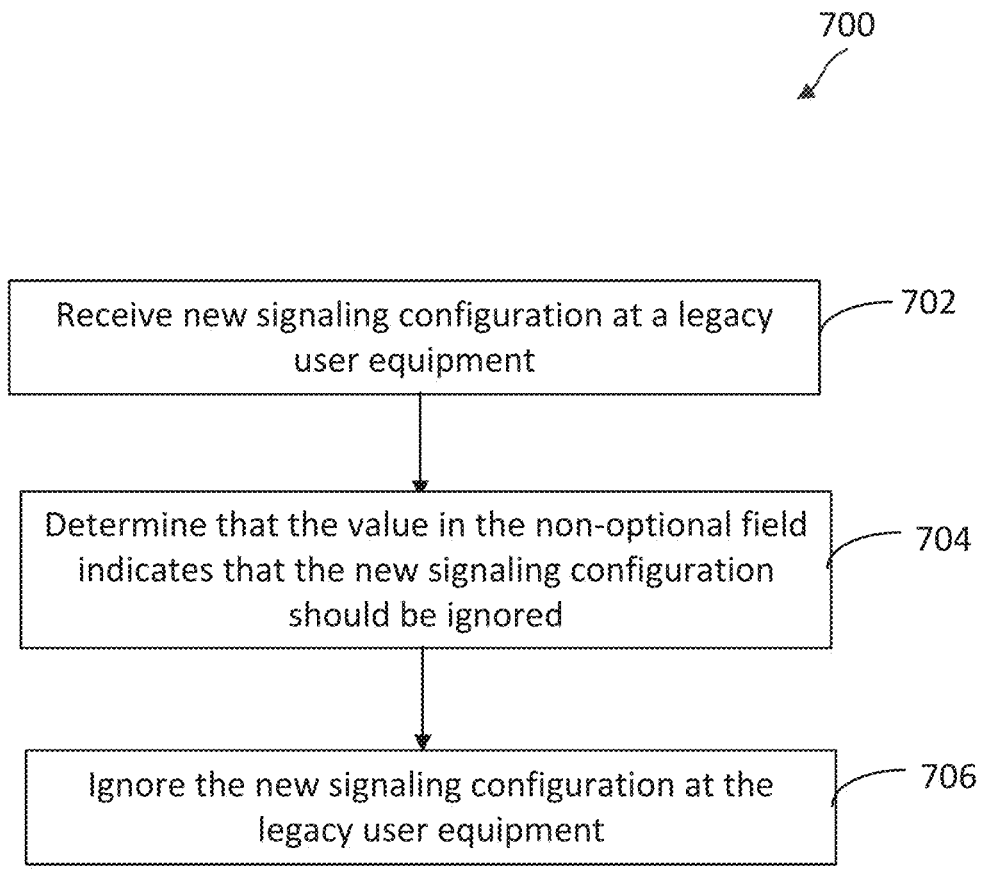
FIG. 7 is a flow diagram of a legacy user equipment (UE) processing new RRC signaling, according to aspects of the disclosure.

FIG. 7 is a flow diagram of a method 700 according to some aspects of the disclosure. Steps of the method 700 can be executed by a computing device (e.g., a processor, processing circuit, and/or other suitable component) of a wireless communication device or other suitable means for performing the steps. For example, a wireless communication device, such as the UE 115, 400 may utilize one or more components, such as the processor 402, the memory 404, signal decoder 408, the transceiver 410, the modem 412, and the one or more antennas 416, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At step 702, the new signaling configuration is decoded at an old or legacy UE. For example, the legacy UE 115*l* may receive the new signaling configuration (e.g. new MBMS signaling configuration) a part of the RRC signaling that sets up an MBMS. The new signaling configuration may be configured in step 602 and includes a mandatory or non-optional field in the legacy configuration and the new configuration. As discussed above, the new signaling configuration may be included in the RRC signaling for setting up the MBMS that includes sub-carrier spacing in a sub frame that is different from the sub-carrier spacing used by the legacy MBMS.

At step 704, the mandatory or non-optional field in the legacy configuration portion of the new signaling configuration is decoded at the legacy UE. For example, the legacy UE 115*l* decodes the mandatory or non-optional field in the legacy configuration (e.g. legacy MBMS configuration) portion of the new signaling configuration. The legacy UE 115*l* determines that the non-optional field includes a value that indicates an error, e.g. all bits are set to zero, the value is out of range of expected values, etc. When the value indicates an error, the legacy UE 115*l* determines that the new signaling configuration is to be ignored.

At step 706, the new signaling configuration is ignored by the legacy UE. For example, the legacy UE 115*l* ignores the new signaling configuration because of an unexpected or error value in the non-optional field. Thus, the legacy UE 115*l* does not set up the new MBMS.

Figure 8:
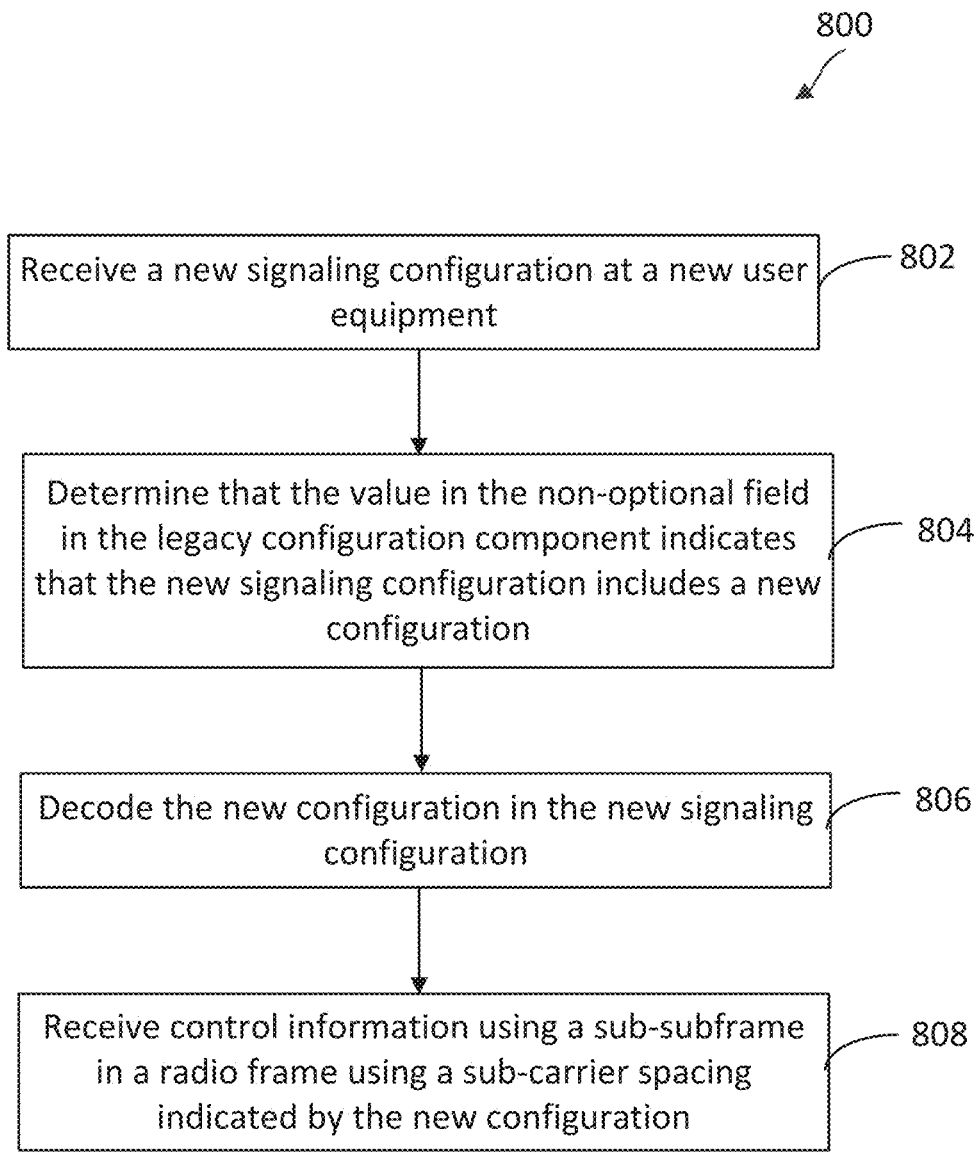
FIG. 8 is a flow diagram of a new user equipment (UE) processing new RRC signaling, according to aspects of the disclosure.

FIG. 8 is a flow diagram of a method 800 according to some aspects of the disclosure. Steps of the method 800 can be executed by a computing device (e.g., a processor, processing circuit, and/or other suitable component) of a wireless communication device or other suitable means for performing the steps. For example, a wireless communication device, such as the UE 115, 400, may utilize one or more components, such as the processor 402, the memory 404, signal decoder 408, the transceiver 410, the modem 412, and the one or more antennas 416, to execute the steps of method 800. As illustrated, the method 800 includes a number of enumerated steps, but aspects of the method 800 may include additional steps before, after, and in between the enumerated steps. In some aspects, one or more of the enumerated steps may be omitted or performed in a different order.

At step 802, the new signaling configuration is decoded at a new UE. For example, the new UE 115*n* may receive a new signaling configuration in the new RRC signaling that sets up an MBMS at the new UE 115*n*. The new signaling configuration may be configured in step 602 and includes a mandatory or non-optional field in the legacy configuration and a new configuration. As discussed above, the new signaling configuration may set up a new MBMS that includes sub-carrier spacing in a sub frame that is different from the sub-carrier spacing in the legacy MBMS.

At step 804, the mandatory or non-optional field in the legacy configuration portion of the new signaling configuration is decoded at the new UE. For example, the new UE 115*n* decodes the mandatory or non-optional field in the legacy configuration portion of the new signaling configuration and determines that the field includes a value that indicates that the new configuration should be decoded, at which point the method proceeds to step 806. Step 804 may be optional in some instances, and the new UE 115*n* may proceed from step 802 to step 806.

At step 806, the new signaling is decoded. For example, the new UE 115*n* decodes the new configuration in the new signaling configuration. As discussed above, the new configuration may indicate sub-carrier spacing for the MBMS that may be used by the new UE 115*n*. The new UE 115*n* decodes the new configuration to determine the sub-carrier spacing.

At step 808, the control information is received using the new configuration. For example, the UE 115*n* may receive control information associated with the MBMS. The control information may be carried by a sub-frame in a radio frame on a sub-carrier indicated by the new signaling configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, at a base station, a multimedia broadcast multicast service (MBMS) configuration, wherein the MBMS configuration includes at least one non-optional field with all bits of the non-optional field set to zero, wherein all the bits set to zero is an indication that the MBMS configuration is associated with the a second user equipment (UE) having a second MBMS capability; and
   broadcasting the MBMS configuration to a first UE and the second UE.

2. The method of claim 1, wherein the MBMS configuration is broadcasted using is a radio resource control (RRC) signaling.

3. The method of claim 1, wherein the indication is associated with a sub-carrier spacing in the MBMS configuration, wherein the sub-carrier spacing is different for the first UE and the second UE.

4. The method of claim 1, wherein the first UE is a legacy UE that uses an older version of the MBMS than the second UE.

5. The method of claim 1, wherein the first UE has different capability from the second UE.

6. The method of claim 1, wherein all the bits set to zero is a value that is out of range of expected values or a value that is not expected by the first UE, wherein the value that is out of range or the value that is not expected indicates that the MBMS configuration is associated with the second UE.

7. The method of claim 1, wherein the determining further comprises:
   configuring at least one bit in the bits of the non-optional field with a one, wherein the at least one bit is the indication that the MBMS configuration is associated with the first UE.

8. The method of claim 1, wherein all the bits set to zero in the at least one non-optional field indicate for the first UE to ignore.

9. The method of claim 1, further comprising:
   receiving an MBMS capability information from the first UE or the second UE, wherein the MBMS capability information is different for the first UE and the second UE; and
   wherein the determining further comprises determining the MBMS configuration and the indication in the at least one non-optional field based on the MBMS capability information.

10. The method of claim 1, wherein the non-optional field is a sf-AllocInfo-r9.

11. The method of claim 1, wherein the non-optional field specifies an offset for a subframe in a radio frame that carries an MBMS common control information.

12. A method of wireless communication, comprising:
    receiving, at a user equipment (UE), a multimedia broadcast multicast service (MBMS) configuration, the MBMS configuration including at least one non-optional field that indicates that the MBMS configuration is associated with a first MBMS capability or a second MBMS capability;
    determining, that all bits of the at least one non-optional field are set to zero, wherein all the bits of the at least one non-optional field set to zero indicate the second MBMS capability to the UE;
    determining the MBMS configuration based on the capability; and
    processing control information according to the MBMS configuration.

13. The method of claim 12, further comprising:
    determining a sub-carrier spacing indicated in the MBMS configuration; and
    receiving the control information carried by a subframe in a radio frame in a sub-carrier indicated by the sub-carrier spacing.

14. The method of claim 12, wherein the UE is a legacy UE having the first MBMS capability and processing the control information further comprises ignoring the MBMS configuration.

15. The method of claim 12, wherein the UE is a new UE having the first MBMS capability and the second MBMS capability and processes a new version and an older version of an MBMS control information as configured in the MBMS configuration.

16. The method of claim 12, wherein the UE is a new UE having the second MBMS capability and processes a new version of a MBMS control information as configured in the MBMS configuration.

17. The method of claim 12, wherein
    the non-optional field including all the bits set to zeros has a value that is out of range of expected values or a value is unexpected to the UE, wherein the value that is out of the range of expected values or is unexpected to the UE indicates that the MBMS configuration is associated with the UE that has the second MBMS capability.

18. The method of claim 12, wherein the determining further comprises:
    receiving at the UE a second MBMS configuration, the second MBMS configuration including at least one non-optional field with at least one bit in the bits of the non-optional field set to one; and
    determining that the at least one bit in the bits of the non-optional field is set to one, wherein the at least one bit that is set to one indicates the first MBMS capability.

19. The method of claim 12, further comprising:
transmitting an MBMS capability information from the UE, wherein the MBMS capability information indicates the second MBMS capability; and
in response to the transmitting, receiving, at the UE, the MBMS configuration including the non-optional field that indicates that the MBMS configuration is compatible with the second MBMS capability.

20. The method of claim 12, wherein the non-optional field is a sf-AllocInfo-r9.

21. An apparatus for wireless communication, comprising:
a processor configured to:
determine, at a base station, a multimedia broadcast multicast service (MBMS) configuration, wherein the MBMS configuration includes at least one non-optional field with all bits set to zero, wherein the at least one non-optional field with all the bits set to zero indicates compatibility with a second UE having a second MBMS capability; and
a transceiver in communication with the processor and configured to:
communicate the MBMS configuration to a first UE and the second UE.

22. The apparatus of claim 21, wherein
all the bits of the non-optional field set to zero in the MBMS configuration indicate to the second UE to process the MBMS configuration.

23. The apparatus of claim 22, wherein the processor is further configured to:
configure a sub-carrier spacing in the MBMS configuration for the second UE.

24. The apparatus of claim 21, wherein the processor is further configured to:
configure at least one bit in the bits of the non-optional field with a one, wherein the at least one bit indicates that the MBMS configuration is associated with the first UE having a first MBMS capability.

25. The apparatus of claim 21, wherein all the bits of the non-optional field set to zero indicate to
the first UE to ignore the MBMS configuration.

26. An apparatus of wireless communication, comprising:
a transceiver configured to:
receive, at a user equipment (UE), a multimedia broadcast multicast service (MBMS) configuration, the MBMS configuration including at least one non-optional field with all bits set to zero, wherein the at least one non-optional field with all the bits set to zero indicates that the MBMS configuration is associated with a second MBMS capability; and
a processor in communication with the transceiver and configured to:
determine, using the at least one non-optional field, capability of the UE, wherein the capability is the second MBMS capability;
determine the MBMS configuration based on the capability; and
processing control information received at the UE according to the MBMS configuration.

27. The apparatus of wireless communication of claim 26, wherein to process the control information the processor is further configured to ignore the MBMS configuration.

28. The apparatus of wireless communication of claim 26, wherein the processor is further configured to:
set a sub-carrier spacing in the UE to a subcarrier spacing in the MBMS configuration.

29. The apparatus of wireless communication of claim 26, wherein the UE is a legacy UE having a first MBMS capability; and
to process the control information the processor is further configured to ignore the MBMS configuration.

30. The apparatus of wireless communication of claim 26, wherein the non-optional field is a sf-AllocInfo-r9.

* * * * *